Figure 1B:
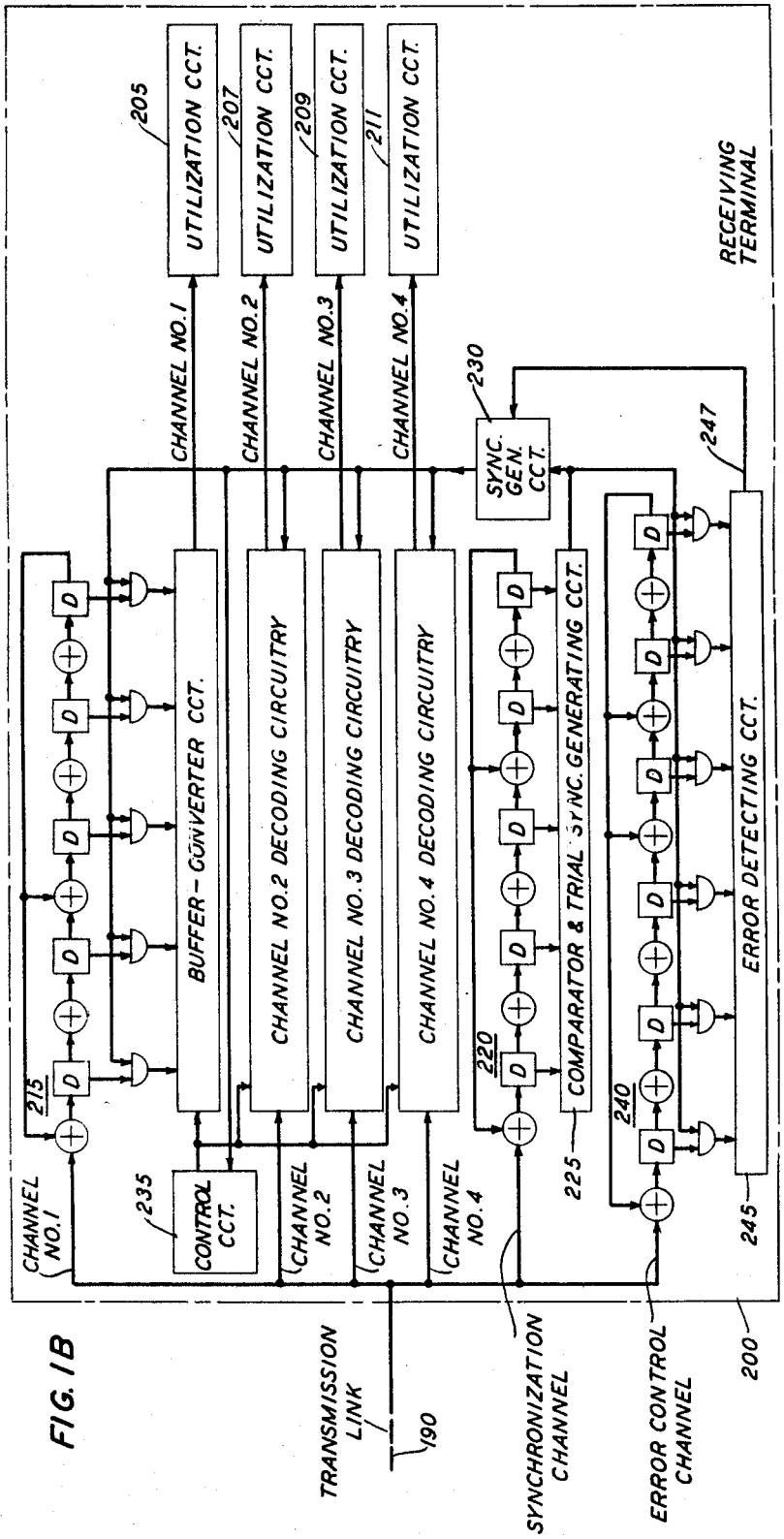

July 23, 1968     H. A. HELM     3,394,224
DIGITAL INFORMATION MULTIPLEXING SYSTEM WITH SYNCHRONIZING MEANS
Filed Aug. 2, 1965     7 Sheets-Sheet 1
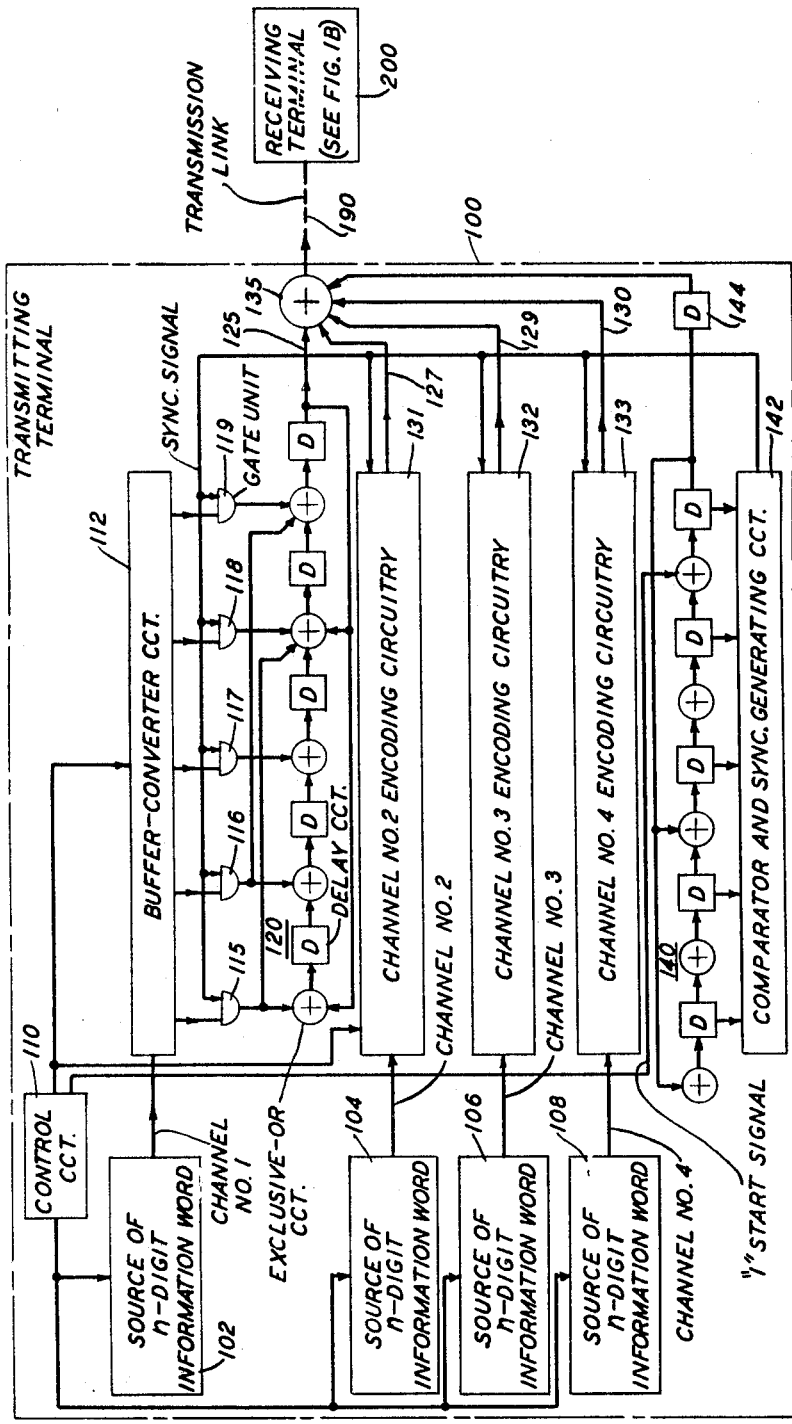
FIG. IA
INVENTOR
H. A. HELM
BY
ATTORNEY

FIG. 2

IDEALS GENERATED BY THE PRIMITIVE IDEMPOTENTS OF $X^7+1$

| $Be_1$ | $Be_2$ | $Be_3$ |
|---|---|---|
| $X^6+X^5+X^4+X^3+X^2+X+1$ | $e_2: X^4+X^2+X+1$ | $e_3: X^6+X^5+X^3+1$ |
| | $Xe_2: X^5+X^3+X^2+X$ | $Xe_3: X^6+X^4+X+1$ |
| | $X^2e_2: X^6+X^4+X^3+X^2$ | $X^2e_3: X^5+X^2+X+1$ |
| | $X^3e_2: X^5+X^4+X^3+1$ | $X^3e_3: X^6+X^3+X^2+1$ |
| | $X^4e_2: X^6+X^5+X^4+X$ | $X^4e_3: X^4+X^3+X^2+1$ |
| | $X^5e_2: X^6+X^5+X^2+1$ | $X^5e_3: X^5+X^4+X+X$ |
| | $X^6e_2: X^6+X^3+X+1$ | $X^6e_3: X^6+X^5+X^4+X^2$ |

FIG. 3A

| IDEAL GENERATED BY THE PRIMITIVE IDEMPOTENT $e_1$ OF $X^{31}+1$ |
|---|
| $Be_1$ |
| $e_1 : X^{28} + X^{26} + X^{25} + X^{22} + X^{21} + X^{20} + X^{19} + X^{18} + X^{14} + X^{13} + X^{11} + X^{10} + X^9 + X^7 + X^5 + 1$ |
| $Xe_1 : X^{29} + X^{27} + X^{26} + X^{23} + X^{22} + X^{21} + X^{20} + X^{19} + X^{15} + X^{14} + X^{12} + X^{11} + X^{10} + X^8 + X^6 + X$ |
| $X^2 e_1 : X^{30} + X^{28} + X^{27} + X^{24} + X^{23} + X^{22} + X^{21} + X^{20} + X^{16} + X^{15} + X^{13} + X^{12} + X^{11} + X^9 + X^7 + X^2$ |
| $X^3 e_1 : X^{29} + X^{28} + X^{25} + X^{24} + X^{23} + X^{22} + X^{21} + X^{17} + X^{16} + X^{14} + X^{13} + X^{12} + X^{10} + X^8 + X^3 + 1$ |
| $X^4 e_1 : X^{30} + X^{29} + X^{26} + X^{25} + X^{24} + X^{23} + X^{22} + X^{18} + X^{17} + X^{15} + X^{14} + X^{13} + X^{11} + X^9 + X^4 + X$ |
| $X^5 e_1 : X^{30} + X^{27} + X^{26} + X^{25} + X^{24} + X^{23} + X^{19} + X^{18} + X^{16} + X^{15} + X^{14} + X^{12} + X^{10} + X^5 + X^2 + 1$ |
| $X^6 e_1 : X^{28} + X^{27} + X^{26} + X^{25} + X^{24} + X^{20} + X^{19} + X^{17} + X^{16} + X^{15} + X^{13} + X^{11} + X^6 + X^3 + X + 1$ |
| $X^7 e_1 : X^{29} + X^{28} + X^{27} + X^{26} + X^{25} + X^{21} + X^{20} + X^{18} + X^{17} + X^{16} + X^{14} + X^{12} + X^7 + X^4 + X^2 + X$ |
| $X^8 e_1 : X^{30} + X^{29} + X^{28} + X^{27} + X^{26} + X^{22} + X^{21} + X^{19} + X^{18} + X^{17} + X^{15} + X^{13} + X^8 + X^5 + X^3 + X^2$ |
| $X^9 e_1 : X^{30} + X^{29} + X^{28} + X^{27} + X^{23} + X^{22} + X^{20} + X^{19} + X^{18} + X^{16} + X^{14} + X^9 + X^6 + X^4 + X^3 + 1$ |
| $X^{10} e_1 : X^{30} + X^{29} + X^{28} + X^{24} + X^{23} + X^{21} + X^{20} + X^{19} + X^{17} + X^{15} + X^{10} + X^7 + X^5 + X^4 + X + 1$ |
| $X^{11} e_1 : X^{30} + X^{29} + X^{25} + X^{24} + X^{22} + X^{21} + X^{20} + X^{18} + X^{16} + X^{11} + X^8 + X^6 + X^5 + X^2 + X + 1$ |
| $X^{12} e_1 : X^{30} + X^{26} + X^{25} + X^{23} + X^{22} + X^{21} + X^{19} + X^{17} + X^{12} + X^9 + X^7 + X^6 + X^3 + X^2 + X + 1$ |
| $X^{13} e_1 : X^{27} + X^{26} + X^{24} + X^{23} + X^{22} + X^{20} + X^{18} + X^{13} + X^{10} + X^8 + X^7 + X^4 + X^3 + X^2 + X + 1$ |
| $X^{14} e_1 : X^{28} + X^{27} + X^{25} + X^{24} + X^{23} + X^{21} + X^{19} + X^{14} + X^{11} + X^9 + X^8 + X^5 + X^4 + X^3 + X^2 + X$ |
| $X^{15} e_1 : X^{29} + X^{28} + X^{26} + X^{25} + X^{24} + X^{22} + X^{20} + X^{15} + X^{12} + X^{10} + X^9 + X^6 + X^5 + X^4 + X^3 + X^2$ |
| $X^{16} e_1 : X^{30} + X^{29} + X^{27} + X^{26} + X^{25} + X^{23} + X^{21} + X^{16} + X^{13} + X^{11} + X^{10} + X^7 + X^6 + X^5 + X^4 + X^3$ |
| $X^{17} e_1 : X^{30} + X^{28} + X^{27} + X^{26} + X^{24} + X^{22} + X^{17} + X^{14} + X^{12} + X^{11} + X^8 + X^7 + X^6 + X^5 + X^4 + 1$ |
| $X^{18} e_1 : X^{29} + X^{28} + X^{27} + X^{25} + X^{23} + X^{18} + X^{15} + X^{13} + X^{12} + X^9 + X^8 + X^7 + X^6 + X^5 + X + 1$ |
| $X^{19} e_1 : X^{30} + X^{29} + X^{28} + X^{26} + X^{24} + X^{19} + X^{16} + X^{14} + X^{13} + X^{10} + X^9 + X^8 + X^7 + X^6 + X^2 + X$ |
| $X^{20} e_1 : X^{30} + X^{29} + X^{27} + X^{25} + X^{20} + X^{17} + X^{15} + X^{14} + X^{11} + X^{10} + X^9 + X^8 + X^7 + X^3 + X^2 + 1$ |
| $X^{21} e_1 : X^{30} + X^{28} + X^{26} + X^{21} + X^{18} + X^{16} + X^{15} + X^{12} + X^{11} + X^{10} + X^9 + X^8 + X^4 + X^3 + X + 1$ |
| $X^{22} e_1 : X^{29} + X^{27} + X^{22} + X^{19} + X^{17} + X^{16} + X^{13} + X^{12} + X^{11} + X^{10} + X^9 + X^5 + X^4 + X^2 + X + 1$ |
| $X^{23} e_1 : X^{30} + X^{28} + X^{23} + X^{20} + X^{18} + X^{17} + X^{14} + X^{13} + X^{12} + X^{11} + X^{10} + X^6 + X^5 + X^3 + X^2 + X$ |
| $X^{24} e_1 : X^{29} + X^{24} + X^{21} + X^{19} + X^{18} + X^{15} + X^{14} + X^{13} + X^{12} + X^{11} + X^7 + X^6 + X^4 + X^3 + X^2 + 1$ |
| $X^{25} e_1 : X^{30} + X^{25} + X^{22} + X^{20} + X^{19} + X^{16} + X^{15} + X^{14} + X^{13} + X^{12} + X^8 + X^7 + X^5 + X^4 + X^3 + X$ |
| $X^{26} e_1 : X^{26} + X^{23} + X^{21} + X^{20} + X^{17} + X^{16} + X^{15} + X^{14} + X^{13} + X^9 + X^8 + X^6 + X^5 + X^4 + X^2 + 1$ |
| $X^{27} e_1 : X^{27} + X^{24} + X^{22} + X^{21} + X^{18} + X^{17} + X^{16} + X^{15} + X^{14} + X^{10} + X^9 + X^7 + X^6 + X^5 + X^3 + X$ |
| $X^{28} e_1 : X^{28} + X^{25} + X^{23} + X^{22} + X^{19} + X^{18} + X^{17} + X^{16} + X^{15} + X^{11} + X^{10} + X^8 + X^7 + X^6 + X^4 + X^2$ |
| $X^{29} e_1 : X^{29} + X^{26} + X^{24} + X^{23} + X^{20} + X^{19} + X^{18} + X^{17} + X^{16} + X^{12} + X^{11} + X^9 + X^8 + X^7 + X^5 + X^3$ |
| $X^{30} e_1 : X^{30} + X^{27} + X^{25} + X^{24} + X^{21} + X^{20} + X^{19} + X^{18} + X^{17} + X^{13} + X^{12} + X^{10} + X^9 + X^8 + X^6 + X^4$ |

FIG. 3B

| IDEAL GENERATED BY THE PRIMITIVE IDEMPOTENT $e_2$ OF $X^{31}+1$ |
|---|
| $Be_2$ |
| $e_2:\ x^{30}+x^{29}+x^{27}+x^{26}+x^{23}+x^{22}+x^{21}+x^{16}+x^{15}+x^{13}+x^{11}+x^8+x^4+x^2+x+1$ |
| $xe_2:\ x^{30}+x^{28}+x^{27}+x^{24}+x^{23}+x^{22}+x^{17}+x^{16}+x^{14}+x^{12}+x^9+x^5+x^3+x^2+x+1$ |
| $x^2e_2:\ x^{29}+x^{28}+x^{25}+x^{24}+x^{23}+x^{18}+x^{17}+x^{15}+x^{13}+x^{10}+x^6+x^4+x^3+x^2+x+1$ |
| $x^3e_2:\ x^{30}+x^{29}+x^{26}+x^{25}+x^{24}+x^{19}+x^{18}+x^{16}+x^{14}+x^{11}+x^7+x^5+x^4+x^3+x^2+x$ |
| $x^4e_2:\ x^{30}+x^{27}+x^{26}+x^{25}+x^{20}+x^{19}+x^{17}+x^{15}+x^{12}+x^8+x^6+x^5+x^4+x^3+x^2+1$ |
| $x^5e_2:\ x^{28}+x^{27}+x^{26}+x^{21}+x^{20}+x^{18}+x^{16}+x^{13}+x^9+x^7+x^6+x^5+x^4+x^3+x+1$ |
| $x^6e_2:\ x^{29}+x^{28}+x^{27}+x^{22}+x^{21}+x^{19}+x^{17}+x^{14}+x^{10}+x^8+x^7+x^6+x^5+x^4+x^2+x$ |
| $x^7e_2:\ x^{30}+x^{29}+x^{28}+x^{23}+x^{22}+x^{20}+x^{18}+x^{15}+x^{11}+x^9+x^8+x^7+x^6+x^5+x^3+x^2$ |
| $x^8e_2:\ x^{30}+x^{29}+x^{24}+x^{23}+x^{21}+x^{19}+x^{16}+x^{12}+x^{10}+x^9+x^8+x^7+x^6+x^4+x^3+1$ |
| $x^9e_2:\ x^{30}+x^{25}+x^{24}+x^{22}+x^{20}+x^{17}+x^{13}+x^{11}+x^{10}+x^9+x^8+x^7+x^5+x^4+x+1$ |
| $x^{10}e_2:\ x^{26}+x^{25}+x^{23}+x^{21}+x^{18}+x^{14}+x^{12}+x^{11}+x^{10}+x^9+x^8+x^6+x^5+x^2+x+1$ |
| $x^{11}e_2:\ x^{27}+x^{26}+x^{24}+x^{22}+x^{19}+x^{15}+x^{13}+x^{12}+x^{11}+x^{10}+x^9+x^7+x^6+x^3+x^2+x$ |
| $x^{12}e_2:\ x^{28}+x^{27}+x^{25}+x^{23}+x^{20}+x^{16}+x^{14}+x^{13}+x^{12}+x^{11}+x^{10}+x^8+x^7+x^4+x^3+x^2$ |
| $x^{13}e_2:\ x^{29}+x^{28}+x^{26}+x^{24}+x^{21}+x^{17}+x^{15}+x^{14}+x^{13}+x^{12}+x^{11}+x^9+x^8+x^5+x^4+x^3$ |
| $x^{14}e_2:\ x^{30}+x^{29}+x^{27}+x^{25}+x^{22}+x^{18}+x^{16}+x^{15}+x^{14}+x^{13}+x^{12}+x^{10}+x^9+x^6+x^5+x^4$ |
| $x^{15}e_2:\ x^{30}+x^{28}+x^{26}+x^{23}+x^{19}+x^{17}+x^{16}+x^{15}+x^{14}+x^{13}+x^{11}+x^{10}+x^7+x^6+x^5+1$ |
| $x^{16}e_2:\ x^{29}+x^{27}+x^{24}+x^{20}+x^{18}+x^{17}+x^{16}+x^{15}+x^{14}+x^{12}+x^{11}+x^8+x^7+x^6+x+1$ |
| $x^{17}e_2:\ x^{30}+x^{28}+x^{25}+x^{21}+x^{19}+x^{18}+x^{17}+x^{16}+x^{15}+x^{13}+x^{12}+x^9+x^8+x^7+x^2+x$ |
| $x^{18}e_2:\ x^{29}+x^{26}+x^{22}+x^{20}+x^{19}+x^{18}+x^{17}+x^{16}+x^{14}+x^{13}+x^{10}+x^9+x^8+x^3+x^2+1$ |
| $x^{19}e_2:\ x^{30}+x^{27}+x^{23}+x^{21}+x^{20}+x^{19}+x^{18}+x^{17}+x^{15}+x^{14}+x^{11}+x^{10}+x^9+x^4+x^3+x$ |
| $x^{20}e_2:\ x^{28}+x^{24}+x^{22}+x^{21}+x^{20}+x^{19}+x^{18}+x^{16}+x^{15}+x^{12}+x^{11}+x^{10}+x^5+x^4+x^2+1$ |
| $x^{21}e_2:\ x^{29}+x^{25}+x^{23}+x^{22}+x^{21}+x^{20}+x^{19}+x^{17}+x^{15}+x^{13}+x^{12}+x^{11}+x^6+x^5+x^3+x$ |
| $x^{22}e_2:\ x^{30}+x^{26}+x^{24}+x^{23}+x^{22}+x^{21}+x^{20}+x^{18}+x^{17}+x^{14}+x^{13}+x^{12}+x^7+x^6+x^4+x^2$ |
| $x^{23}e_2:\ x^{27}+x^{25}+x^{24}+x^{23}+x^{22}+x^{21}+x^{19}+x^{18}+x^{15}+x^{14}+x^{13}+x^8+x^7+x^5+x^3+1$ |
| $x^{24}e_2:\ x^{28}+x^{26}+x^{25}+x^{24}+x^{23}+x^{22}+x^{20}+x^{19}+x^{16}+x^{15}+x^{14}+x^9+x^8+x^6+x^4+x$ |
| $x^{25}e_2:\ x^{29}+x^{27}+x^{26}+x^{25}+x^{24}+x^{23}+x^{21}+x^{20}+x^{17}+x^{16}+x^{15}+x^{10}+x^9+x^7+x^5+x^2$ |
| $x^{26}e_2:\ x^{30}+x^{28}+x^{27}+x^{26}+x^{25}+x^{24}+x^{22}+x^{21}+x^{18}+x^{17}+x^{16}+x^{11}+x^{10}+x^8+x^6+x^3$ |
| $x^{27}e_2:\ x^{29}+x^{28}+x^{27}+x^{26}+x^{25}+x^{23}+x^{22}+x^{19}+x^{18}+x^{17}+x^{12}+x^{11}+x^9+x^7+x^4+1$ |
| $x^{28}e_2:\ x^{30}+x^{29}+x^{28}+x^{27}+x^{26}+x^{24}+x^{23}+x^{20}+x^{19}+x^{18}+x^{13}+x^{12}+x^{10}+x^8+x^5+x$ |
| $x^{29}e_2:\ x^{30}+x^{29}+x^{28}+x^{27}+x^{25}+x^{24}+x^{21}+x^{20}+x^{19}+x^{14}+x^{13}+x^{11}+x^9+x^5+x^2+1$ |
| $x^{30}e_2:\ x^{30}+x^{29}+x^{28}+x^{26}+x^{25}+x^{22}+x^{21}+x^{20}+x^{15}+x^{14}+x^{12}+x^{10}+x^7+x^3+x+1$ |

FIG. 3C

| IDEAL GENERATED BY THE PRIMITIVE IDEMPOTENT $e_3$ OF $X^{31}+1$ |
|---|
| $Be_3$ |
| $e_3 \;\;\;\;:\; X^{30}+X^{29}+X^{27}+X^{23}+X^{20}+X^{18}+X^{16}+X^{15}+X^{10}+X^{9}+X^{8}+X^{5}+X^{4}+X^{2}+X+1$ |
| $Xe_3 \;\;:\; X^{30}+X^{28}+X^{24}+X^{21}+X^{19}+X^{17}+X^{16}+X^{11}+X^{10}+X^{9}+X^{6}+X^{5}+X^{3}+X^{2}+X+1$ |
| $X^2 e_3 \;:\; X^{29}+X^{25}+X^{22}+X^{20}+X^{18}+X^{17}+X^{12}+X^{11}+X^{10}+X^{7}+X^{6}+X^{4}+X^{3}+X^{2}+X+1$ |
| $X^3 e_3 \;:\; X^{30}+X^{26}+X^{23}+X^{21}+X^{19}+X^{18}+X^{13}+X^{12}+X^{11}+X^{8}+X^{7}+X^{5}+X^{4}+X^{3}+X^{2}+X$ |
| $X^4 e_3 \;:\; X^{27}+X^{24}+X^{22}+X^{20}+X^{19}+X^{14}+X^{13}+X^{12}+X^{9}+X^{8}+X^{6}+X^{5}+X^{4}+X^{3}+X^{2}+1$ |
| $X^5 e_3 \;:\; X^{28}+X^{25}+X^{23}+X^{21}+X^{20}+X^{15}+X^{14}+X^{13}+X^{10}+X^{9}+X^{7}+X^{6}+X^{5}+X^{4}+X^{3}+X$ |
| $X^6 e_3 \;:\; X^{29}+X^{26}+X^{24}+X^{22}+X^{21}+X^{16}+X^{15}+X^{14}+X^{11}+X^{10}+X^{8}+X^{7}+X^{6}+X^{5}+X^{4}+X^{2}$ |
| $X^7 e_3 \;:\; X^{30}+X^{27}+X^{25}+X^{23}+X^{22}+X^{17}+X^{16}+X^{15}+X^{12}+X^{11}+X^{9}+X^{8}+X^{7}+X^{6}+X^{5}+X^{3}$ |
| $X^8 e_3 \;:\; X^{28}+X^{26}+X^{24}+X^{23}+X^{18}+X^{17}+X^{16}+X^{13}+X^{12}+X^{10}+X^{9}+X^{8}+X^{7}+X^{6}+X^{4}+1$ |
| $X^9 e_3 \;:\; X^{29}+X^{27}+X^{25}+X^{24}+X^{19}+X^{18}+X^{17}+X^{14}+X^{13}+X^{11}+X^{10}+X^{9}+X^{8}+X^{7}+X^{5}+X$ |
| $X^{10} e_3 : X^{30}+X^{28}+X^{26}+X^{25}+X^{20}+X^{19}+X^{18}+X^{15}+X^{14}+X^{12}+X^{11}+X^{10}+X^{9}+X^{8}+X^{6}+X^{2}$ |
| $X^{11} e_3 : X^{29}+X^{27}+X^{26}+X^{21}+X^{20}+X^{19}+X^{16}+X^{15}+X^{13}+X^{12}+X^{11}+X^{10}+X^{9}+X^{7}+X^{3}+1$ |
| $X^{12} e_3 : X^{30}+X^{28}+X^{27}+X^{22}+X^{21}+X^{20}+X^{17}+X^{16}+X^{14}+X^{13}+X^{12}+X^{11}+X^{10}+X^{8}+X^{4}+X$ |
| $X^{13} e_3 : X^{29}+X^{28}+X^{23}+X^{22}+X^{21}+X^{18}+X^{17}+X^{15}+X^{14}+X^{13}+X^{12}+X^{11}+X^{9}+X^{5}+X^{2}+1$ |
| $X^{14} e_3 : X^{30}+X^{29}+X^{24}+X^{23}+X^{22}+X^{19}+X^{18}+X^{16}+X^{15}+X^{14}+X^{13}+X^{12}+X^{10}+X^{6}+X^{3}+X$ |
| $X^{15} e_3 : X^{30}+X^{25}+X^{24}+X^{23}+X^{20}+X^{19}+X^{17}+X^{16}+X^{15}+X^{14}+X^{13}+X^{11}+X^{7}+X^{4}+X^{2}+1$ |
| $X^{16} e_3 : X^{26}+X^{25}+X^{24}+X^{21}+X^{20}+X^{18}+X^{17}+X^{16}+X^{15}+X^{14}+X^{12}+X^{8}+X^{5}+X^{3}+X+1$ |
| $X^{17} e_3 : X^{27}+X^{26}+X^{25}+X^{22}+X^{21}+X^{19}+X^{18}+X^{17}+X^{16}+X^{15}+X^{13}+X^{9}+X^{6}+X^{4}+X^{2}+X$ |
| $X^{18} e_3 : X^{28}+X^{27}+X^{26}+X^{23}+X^{22}+X^{20}+X^{19}+X^{18}+X^{17}+X^{16}+X^{14}+X^{10}+X^{7}+X^{5}+X^{3}+X^{2}$ |
| $X^{19} e_3 : X^{29}+X^{28}+X^{27}+X^{24}+X^{23}+X^{21}+X^{20}+X^{19}+X^{18}+X^{17}+X^{15}+X^{11}+X^{8}+X^{6}+X^{4}+X^{3}$ |
| $X^{20} e_3 : X^{30}+X^{29}+X^{28}+X^{25}+X^{24}+X^{22}+X^{21}+X^{20}+X^{19}+X^{18}+X^{16}+X^{12}+X^{9}+X^{7}+X^{5}+X^{4}$ |
| $X^{21} e_3 : X^{30}+X^{29}+X^{26}+X^{25}+X^{23}+X^{22}+X^{21}+X^{20}+X^{19}+X^{17}+X^{13}+X^{10}+X^{8}+X^{6}+X^{5}+1$ |
| $X^{22} e_3 : X^{30}+X^{27}+X^{26}+X^{24}+X^{23}+X^{22}+X^{21}+X^{20}+X^{18}+X^{14}+X^{11}+X^{9}+X^{7}+X^{6}+X+1$ |
| $X^{23} e_3 : X^{28}+X^{27}+X^{25}+X^{24}+X^{23}+X^{22}+X^{21}+X^{19}+X^{15}+X^{12}+X^{10}+X^{8}+X^{7}+X^{2}+X+1$ |
| $X^{24} e_3 : X^{29}+X^{28}+X^{26}+X^{25}+X^{24}+X^{23}+X^{22}+X^{20}+X^{16}+X^{13}+X^{11}+X^{9}+X^{8}+X^{3}+X^{2}+X$ |
| $X^{25} e_3 : X^{30}+X^{29}+X^{27}+X^{26}+X^{25}+X^{24}+X^{23}+X^{21}+X^{17}+X^{14}+X^{12}+X^{10}+X^{9}+X^{4}+X^{3}+X^{2}$ |
| $X^{26} e_3 : X^{30}+X^{28}+X^{27}+X^{26}+X^{25}+X^{24}+X^{22}+X^{18}+X^{15}+X^{13}+X^{11}+X^{10}+X^{5}+X^{4}+X^{3}+1$ |
| $X^{27} e_3 : X^{29}+X^{28}+X^{27}+X^{26}+X^{25}+X^{23}+X^{19}+X^{16}+X^{14}+X^{12}+X^{11}+X^{6}+X^{5}+X^{4}+X+1$ |
| $X^{28} e_3 : X^{30}+X^{29}+X^{28}+X^{27}+X^{26}+X^{24}+X^{20}+X^{17}+X^{15}+X^{13}+X^{12}+X^{7}+X^{6}+X^{5}+X^{2}+X$ |
| $X^{29} e_3 : X^{30}+X^{29}+X^{28}+X^{27}+X^{25}+X^{21}+X^{18}+X^{16}+X^{14}+X^{13}+X^{8}+X^{7}+X^{6}+X^{3}+X^{2}+1$ |
| $X^{30} e_3 : X^{30}+X^{29}+X^{28}+X^{26}+X^{22}+X^{19}+X^{17}+X^{15}+X^{14}+X^{9}+X^{8}+X^{7}+X^{4}+X^{3}+X+1$ |

FIG. 3D

| | IDEAL GENERATED BY THE PRIMITIVE IDEMPOTENT $e_4$ OF $X^{31}+1$ |
|---|---|
| | $Be_4$ |
| $e_4$ | $:x^{30}+x^{29}+x^{28}+x^{27}+x^{25}+x^{24}+x^{23}+x^{19}+x^{17}+x^{15}+x^{14}+x^{12}+x^7+x^6+x^3+1$ |
| $xe_4$ | $:X^{30}+X^{29}+X^{28}+X^{26}+X^{25}+X^{24}+X^{20}+X^{18}+X^{16}+X^{15}+X^{13}+X^8+X^7+X^4+X+1$ |
| $x^2e_4$ | $:X^{30}+X^{29}+X^{27}+X^{26}+X^{25}+X^{21}+X^{19}+X^{17}+X^{16}+X^{14}+X^9+X^8+X^5+X^2+X+1$ |
| $x^3e_4$ | $:x^{30}+x^{28}+x^{27}+x^{26}+x^{22}+x^{20}+x^{18}+x^{17}+x^{15}+x^{10}+x^9+x^6+x^3+x^2+x+1$ |
| $x^4e_4$ | $:x^{29}+x^{28}+x^{27}+x^{23}+x^{21}+x^{19}+x^{18}+x^{16}+x^{11}+x^{10}+x^7+x^4+x^3+x^2+x+1$ |
| $x^5e_4$ | $:X^{30}+X^{29}+X^{28}+X^{24}+X^{22}+X^{20}+X^{19}+X^{17}+X^{12}+X^{11}+X^8+X^5+X^4+X^3+X^2+X$ |
| $x^6e_4$ | $:X^{30}+X^{29}+X^{25}+X^{23}+X^{21}+X^{20}+X^{18}+X^{13}+X^{12}+X^9+X^6+X^5+X^4+X^3+X^2+1$ |
| $x^7e_4$ | $:x^{30}+x^{26}+x^{24}+x^{22}+x^{21}+x^{19}+x^{14}+x^{13}+x^{10}+x^7+x^6+x^5+x^4+x^3+X+1$ |
| $x^8e_4$ | $:x^{27}+x^{25}+x^{23}+x^{22}+x^{20}+x^{15}+x^{14}+x^{11}+x^8+x^7+x^6+x^5+x^4+x^2+X+1$ |
| $x^9e_4$ | $:X^{28}+X^{26}+X^{24}+X^{23}+X^{21}+X^{16}+X^{15}+X^{12}+X^9+X^8+X^7+X^6+X^5+X^3+X^2+X$ |
| $x^{10}e_4$ | $:X^{29}+X^{27}+X^{25}+X^{24}+X^{22}+X^{17}+X^{16}+X^{13}+X^{10}+X^9+X^8+X^7+X^6+X^4+X^3+X^2$ |
| $x^{11}e_4$ | $:X^{30}+X^{28}+X^{26}+X^{25}+X^{23}+X^{18}+X^{17}+X^{14}+X^{11}+X^{10}+X^9+X^8+X^7+X^5+X^4+X^3$ |
| $x^{12}e_4$ | $:x^{29}+x^{27}+x^{26}+x^{24}+x^{19}+x^{18}+x^{15}+x^{12}+x^{11}+x^{10}+x^9+x^8+x^6+x^5+x^4+1$ |
| $x^{13}e_4$ | $:x^{30}+x^{28}+x^{27}+x^{25}+x^{20}+x^{19}+x^{16}+x^{13}+x^{12}+x^{11}+x^{10}+x^9+x^7+x^6+x^5+X$ |
| $x^{14}e_4$ | $:X^{29}+X^{28}+X^{26}+X^{21}+X^{20}+X^{17}+X^{14}+X^{13}+X^{12}+X^{11}+X^{10}+X^8+X^7+X^6+X^2+1$ |
| $x^{15}e_4$ | $:x^{30}+x^{29}+x^{27}+x^{22}+x^{21}+x^{18}+x^{15}+x^{14}+x^{13}+x^{12}+x^{11}+x^9+x^8+x^7+x^3+X$ |
| $x^{16}e_4$ | $:X^{30}+X^{28}+X^{23}+X^{22}+X^{19}+X^{16}+X^{15}+X^{14}+X^{13}+X^{12}+X^{10}+X^9+X^8+X^4+X^2+1$ |
| $x^{17}e_4$ | $:x^{29}+x^{24}+x^{23}+x^{20}+x^{17}+x^{16}+x^{15}+x^{14}+x^{13}+x^{11}+x^{10}+x^9+x^5+x^3+X+1$ |
| $x^{18}e_4$ | $:X^{30}+X^{25}+X^{24}+X^{21}+X^{18}+X^{17}+X^{16}+X^{15}+X^{14}+X^{12}+X^{11}+X^{10}+X^6+X^4+X^2+X$ |
| $x^{19}e_4$ | $:x^{26}+x^{25}+x^{22}+x^{19}+x^{18}+x^{17}+x^{16}+x^{15}+x^{13}+x^{12}+x^{11}+x^7+x^5+x^3+x^2+1$ |
| $x^{20}e_4$ | $:x^{27}+x^{26}+x^{23}+x^{20}+x^{19}+x^{18}+x^{17}+x^{16}+x^{14}+x^{13}+x^{12}+x^8+x^6+x^4+x^3+X$ |
| $x^{21}e_4$ | $:x^{28}+x^{27}+x^{24}+x^{21}+x^{20}+x^{19}+x^{18}+x^{17}+x^{15}+x^{14}+x^{13}+x^9+x^7+x^5+x^4+x^2$ |
| $x^{22}e_4$ | $:x^{29}+x^{28}+x^{25}+x^{22}+x^{21}+x^{20}+x^{19}+x^{18}+x^{16}+x^{15}+x^{14}+x^{10}+x^8+x^6+x^5+x^3$ |
| $x^{23}e_4$ | $:x^{30}+x^{29}+x^{26}+x^{23}+x^{22}+x^{21}+x^{20}+x^{19}+x^{17}+x^{16}+x^{15}+x^{11}+x^9+x^7+x^6+x^4$ |
| $x^{24}e_4$ | $:x^{30}+x^{27}+x^{24}+x^{23}+x^{22}+x^{21}+x^{20}+x^{18}+x^{17}+x^{16}+x^{12}+x^{10}+x^8+x^7+x^5+1$ |
| $x^{25}e_4$ | $:x^{28}+x^{25}+x^{24}+x^{23}+x^{22}+x^{21}+x^{19}+x^{18}+x^{17}+x^{13}+x^{11}+x^9+x^8+x^6+X+1$ |
| $x^{26}e_4$ | $:x^{29}+x^{26}+x^{25}+x^{24}+x^{23}+x^{22}+x^{20}+x^{19}+x^{18}+x^{14}+x^{12}+x^{10}+x^9+x^7+x^2+X$ |
| $x^{27}e_4$ | $:x^{30}+x^{27}+x^{26}+x^{25}+x^{24}+x^{23}+x^{21}+x^{20}+x^{19}+x^{15}+x^{13}+x^{11}+x^{10}+x^8+x^3+x^2$ |
| $x^{28}e_4$ | $:x^{28}+x^{27}+x^{26}+x^{25}+x^{24}+x^{22}+x^{21}+x^{20}+x^{16}+x^{14}+x^{12}+x^{11}+x^9+x^4+x^3+1$ |
| $x^{29}e_4$ | $:x^{29}+x^{28}+x^{27}+x^{26}+x^{25}+x^{23}+x^{22}+x^{21}+x^{17}+x^{15}+x^{13}+x^{12}+x^{10}+x^5+x^4+X$ |
| $x^{30}e_4$ | $:x^{30}+x^{29}+x^{28}+x^{27}+x^{26}+x^{24}+x^{23}+x^{22}+x^{18}+x^{16}+x^{14}+x^{13}+x^{11}+x^6+x^5+x^2$ |

United States Patent Office 3,394,224
Patented July 23, 1968

3,394,224
DIGITAL INFORMATION MULTIPLEXING SYSTEM WITH SYNCHRONIZING MEANS
Harry A. Helm, Bethesda, Md., assignor to Bell Telephone Laboratories, Incorporated, New York, N.Y., a corporation of New York
Filed Aug. 2, 1965, Ser. No. 476,380
15 Claims. (Cl. 178—50)

This invention relates to digital data communications and, more particularly, to a transmission system in which a plurality of digital data words are multiplexed in a unique way onto a common transmission channel.

Various types of multiplexing systems are well known in the art. In one such system, message samples derived from several input signal sources are interleaved in time and then applied to a common channel for transmission. Interleaving signals on a time basis in this way is called "time division multiplexing."

At the receiving end of a time division multiplexing system the inverse function of demultiplexing is performed. Demultiplexing involves switching at precisely-fixed times with respect to the multiplexing operation, thereby to retrieve and reconstruct the transmitted segments associated with each original input message. Exact synchronization of the multiplexing and demultiplexing operations is obviously necessary to avoid erroneous reassembly of the transmitted messages. The synchronization problem is a critical and difficult one whose solution has been actively sought. Typical solutions to the problem involve the provision of synchronization recovery and timing circuits which, as a practical matter, are usually characterized by considerable complexity. It is therefore an object of the present invention to provide an improved multiplexing system.

More specifically, an object of this invention is a multiplexing system in which an indication of the synchronization condition thereof is provided in a simple and efficient manner.

Another object of the present invention is a multiplexing system which is further characterized by effective error control capabilities.

These and other objects of the present invention are realized in a specific illustrative system embodiment thereof in which a plurality of encoded digital information words and a synchronizing word are multiplexed to form a composite word which is applied to a common communication link for transmission to a remote receiving terminal. In particular, each of a plurality of $n$-digit information sequences is encoded to form a redundant sequence $2^n-1$ digits in length. These redundant sequences are then combined in a digit-by-digit manner (via a modulo 2 adder circuit) with a synchronizing sequence $2^n-1$ digits long to form a composite word which is also $2^n-1$ digits in length.

At the receiving terminal the information word content of the transmitted composite word is demultiplexed and the original information words are respectively applied to a plurality of utilization circuits. Furthermore, additional circuitry in the receiving terminal responds to the composite word to abstract therefrom that portion which contains synchronization information. In addition, there is embodied in the composite word an error control capability which permits errors in the transmitted word to be detected by a simple decoding operation at the receiving terminal. In this way both the synchronization condition and error status of the demultiplexed information words are determined.

It is thus a feature of the present invention that a multiplexing system comprise circuitry for encoding each of a plurality of $n$-digit information words into a redundant word $2^n-1$ digits long, and that the redundant words be combined in a modulo 2 adder circuit with a synchronization word $2^n-1$ digits long to form a composite word $2^n-1$ digits in length.

It is another feature of this invention that the system include a receiving terminal having circuitry responsive to the composite word for abstracting therefrom the originally-supplied plurality of $n$-digit information words and that the receiving terminal further include circuitry for deriving control information from the composite word concerning the synchronization condition and error status of the abstracted information words.

A complete understanding of the present invention and of the above and other features, advantages and variations thereof may be gained from a consideration of the following detailed description of an illustrative embodiment thereof presented hereinbelow in connection with the accompanying drawing, in which:

FIGS. 1A and 1B, considered together, depict a specific illustrative communication system made in accordance with the principles of the present invention;

FIG. 2 is a listing of the sets of polynomials generated by the primitive idempotents of $X^7+1$; and FIGS. 3A, 3B, 3C and 3D, respectively, list four sets of polynomials generated by four of the primitive idempotents of $X^{31}+1$.

Certain mathematical concepts are basic to an understanding of the underlying principles of the present invention. Hence, before proceeding to a detailed description of the specific illustrative system shown in FIGS. 1A and 1B, it will be helpful to a clear presentation of the invention to consider these concepts.

Assume that it is desired to send a plurality of $n$-digit information words between intercoupled transmitting and receiving terminals. To do so in accordance with the principles of this invention requires selection of a polynomial of the form $$X^{2^n-1}+1 \qquad (1)$$

Since $2^n-1$ is an odd number, polynomial (1) has no multiple factors when the polynomial is factored into its irreducible factors. When $2^n-1$ is prime, all the irreducible factors except $X+1$ are of the same degree. Thus, for example, for the case wherein $n=3$, $$X^{2^n-1}+1 = X^7+1 = (X+1)(X^3+X+1)$$
$$(X^3+X^2+1) = p_1(X)p_2(X)p_3(X) \qquad (2)$$

More generally let $$X^n+1 = p_1(X)p_2(X) \ldots p_i(X) \ldots$$
$$p_r(X) = \Pi p_i(X) 1 \leq i \leq r \qquad (3)$$

Define $$\varphi_j(X) = \Pi p_i(X) i \neq j \qquad (4)$$

That is, $\varphi_j(X)$ is the product of all the factors of $X^n+1$ except $p_j(X)$. In the case of (2) we have:

$$\varphi_1(X) = p_2(X)p_3(X) = (X^3+X+1)(X^3+X^2+1)$$
$$\varphi_2(X) = p_1(X)p_3(X) = (X+1)(X^3+X^2+1) \qquad (5)$$
$$\varphi_3(X) = p_1(X)p_2(X) = (X+1)(X^3+X+1)$$

Now, since no $\varphi_j(X)$ has all its factors in common with any other, no $\varphi_j(X)$ divides any other evenly, i.e., the $\varphi_j$ are relatively prime. Thus, from the Euclidean Algorithm, there exist polynomials $\mu_j(X)$ such that:

$$\sum_{i=1}^{jr} \mu_i(X)\varphi_i(X) = \mu_1(X)\varphi_1(X) +$$
$$\mu_2(X)\varphi_2(X) \ldots + \mu_r(X)\varphi_r(X) = 1 \qquad (6)$$

As an example, consider the factors of (2) with the $\varphi_j$ given by (5). Here one has:

$$\mu_1(X) = 1$$
$$\mu_2(X) = (X^3 + X) \quad (7)$$
$$\mu_3(X) = X^3$$

and $$\sum_{j=1}^{3} \mu_j(X)\varphi_j(X) = (X^3+X+1)(X^3+X^2+1) + (X^3+X)(X+1)((X^3+X^2+1)+X^3(X+1)(X^3+X+1) = (X^6+X^5+X^4+X^3+X^2+X+1)+(X^7+X^4+X^2+X)+ (X^7+X^6+X^5+X^3) = 1 \quad (8)$$

Now let $\mu_j(X)\varphi_i(X) = e_i$. Equation 6 now becomes $$\sum_{i=1}^{r} e_i + 1 \quad (9)$$

It is noted that in manipulating polynomials herein $X^n$ is always set equal to 1 and all additions of polynomials and digital sequences are carried out modulo 2. Hence, it is apparent that $$X^n + 1 = 0 \quad (10)$$

Now, if we multiply both sides of Equation 9 by $e_j$, we have $$\sum_{i=1}^{r} e_i e_j = e_j \quad (11)$$

But $$e_i e_j = \mu_i \varphi_i \mu_j \varphi_j \quad (12)$$

Since $\varphi_i$ contains all factors of $X^n + 1$ except the $i$th, which $\varphi_j$ contains, the product $\varphi_i \varphi_j$ is a multiple of $X^n + 1$ and hence zero unless $i = j$. Hence, (11) reduces to:

$$e_j^2 = e_j \quad (13)$$

The $e_i$ are called primitive idempotents. (An idempotent is an expression which when multiplied by itself gives itself. The number 1 is a simple example of such an expression.) Since $e_i e_j = 0$, the idempotents $e_i$ and $e_j$ are said to be orthogonal. The orthogonality property implies that no polynomial not identically zero can be a multiple of more than one $e_i$. Such a polynomial can, however, be a sum of more than one $e_i$.

For simplicity, let us denote the ring of polynomials modulo $(X^{2n-1}+1)$ as B. Let $Be_i$ stand for the ideal formed of all possible multiples of $e_i$. (Being an element of an ideal, for the elements of the above polynomial ring, means that all allowable digital sequences thereof are multiples of some polynomial which divides $X^n+1$.) FIG. 2 lists the ideals of $X^{2n-1}+1$ for the specific case wherein $n=3$.

The basic multiplexing proposal of the present invention involves assigning all the $Be_1$ values to an input channel designated No. 1, all the $Be_2$ values to an input channel No. 2, all the $Be_3$ values to an input channel No. 3, and so forth. Specifically, we shall take the signals that appear on input channel No. 1 and encode them as some element of $Be_1$ and then add to this the element of $Be_2$ obtained by encoding the signals appearing on input channel No. 2, and so on. Thus, the composite sequence derived from the various input channels and actually applied to the common transmission link is given by $$Be_1 + Be_2 + \ldots + Be_r \quad (14)$$

Suppose then, we wish to perform a decoding operation for channel No. 1. To do this we simply multiply (14) by $e_1$, thereby to obtain $$Be_1^2 + Be_2 e_1 + \ldots + Be_r e_1 = Be_1^2 = Be_1 \quad (15)$$

by the aforementioned orthogonality and idempotent properties.

A simple encoding-decoding example given with the aid of the polynomials listed in FIG. 2 will be helpful to an understanding of the essential relationships described above. Since the $Be_1$ list of FIG. 2 includes only one entry, we will use only $Be_2$ and $Be_3$ for encoding purposes. There are seven polynomials in each of $Be_2$ and $Be_3$, so each list is utilizable as a code book for encoding any non-zero 3-digit input information word. For example, assume that a 3-digit information word appearing on channel No. 1 is encoded into a 7-digit redundant version thereof. Specifically, assume that the 3-digit information word 001 is encoded into the 7-digit word defined by the third polynomial in the $Be_2$ list. The third polynomial is in effect $$1 \cdot X^6 + 0 \cdot X^5 + 1 \cdot X^4 + 1 \cdot X^3 + 1 \cdot X^2 + 0 \cdot X^1 + 0 \cdot X^0$$

which is representative of the 7-digit sequence $$1011100 \quad (16)$$

Assume further that a 3-digit information word on channel No. 2 is encoded into, for example, the fourth polynomial in the $Be_3$ list. This polynomial is $X^6 + X^3 + X^2 + X$, which is representative of the 7-digit sequence $$1001110 \quad (17)$$

Combining (16) and (17) by the standard rules of modulo 2 addition gives $X^4 + X$, or $$0010010 \quad (18)$$

which is the actual composite digital sequence to be sent over the common transmission channel.

At a receiving terminal the two original 3-digit information words are recovered from the composite received word by applying the composite word to each of two 3-stage feedback shift register decoding circuits. Each of these circuits is effective to divide the polynomial representative of the composite word by the reciprocal of the irreducible polynomial factor from which the corresponding idempotent was derived. After seven (or more generally $2^n - 1$) shifts of the decoding circuits, the representations respectively stored therein are the two original $n$-digit information words encoded at the transmitting terminal.

It is noted that for every irreducible polynomial there is another irreducible polynomial called its reciprocal which, if $p(X)$ is a polynomial of degree $k$, may be expressed as follows:

$$X^k p(X^{-1}) \quad (19)$$

Thus, for example, the reciprocal polynomial of $X^3 + X + 1$ is $X^3 + X^2 + 1$.

To illustrate the above and other basic concepts of the present invention in more specific detail, let us take a particular exemplary case wherein it is desired to send the respective output signals of a plurality of information sources from a transmitting terminal to an associated receiving terminal. Assume, for example, that each such source supplies 5-digit information sequences. In accordance with expression (1) above, we therefore form the polynomial $$X^{31} + 1 \quad (20)$$

The irreducible factors of polynomial (20) are set out below:

$$X+1$$
$$X^5+X^2+1$$
$$X^5+X^3+1$$
$$X^5+X^3+X^2+X+1 \quad (21)$$
$$X^5+X^4+X^2+X+1$$
$$X^5+X^4+X^3+X+1$$
$$X^5+X^4+X^3+X^2+1$$

There are six polynomial factors in listing (21) whose degree is 5. This indicates that the output signals of six different information sources may be multiplexed together to form a composite word for transmission to an associated receiving terminal. However, in order to be able to illustrate the case in which synchronization and error control capabilities are to be embodied in the composite word, two of these 5-degree polynomials will be reserved for synchronization and error control purposes. This leaves four irreducible factors of degree 5 for multiplexing use. Illustratively, we will consider the first four 5-degree polynomials of (21) to be reserved for multiplexing. In accordance with the description hereinabove of idempotents, it is apparent that a set of four orthogonal primitive idempotents can be respectively derived from the four polynomials reserved for multiplexing. These four idempotents of $X^{31}+1$ are set out below:

$$e_1 = X^{28} + X^{26} + X^{25} + X^{22} + X^{21} + X^{20} + X^{19} + X^{18}$$
$$+ X^{14} + X^{13} + X^{11} + X^{10} + X^9 + X^7 + X^5 + 1$$

$$e_2 = X^{30} + X^{29} + X^{27} + X^{26} + X^{23} + X^{22} + X^{21} + X^{16}$$
$$+ X^{15} + X^{13} + X^{11} + X^8 + X^4 + X^2 + X + 1 \quad (22)$$

$$e_3 = X^{30} + X^{29} + X^{27} + X^{23} + X^{20} + X^{18} + X^{16} + X^{15}$$
$$+ X^{10} + X^9 + X^8 + X^5 + X^4 + X^2 + X + 1$$

$$e_4 = X^{30} + X^{29} + X^{28} + X^{27} + X^{25} + X^{24} + X^{23} + X^{19}$$
$$+ X^{17} + X^{15} + X^{14} + X^{12} + X^7 + X^6 + X^3 + 1$$

It is noted that the idempotents listed in (22) may be derived according to the procedures described hereinabove or according to conventional techniques well known in the field of modern algebra. See, for example, G. Birkhoff and S. MacLane, A Survey of Modern Algebra, revised edition, 1953, pp. 18–20, 75–77, MacMillan Co., New York, for an alternative description of the techniques to follow in deriving the listed idempotents from their corresponding irreducible polynomial factors.

For each of the four idempotents of (22) we can form an ideal which includes all possible multiples of $e_1$. The four ideals generated by the idempotents of (22) are listed in FIGS. 3A, 3B, 3C and 3D, respectively. Each of these ideals includes 31 different polynomials and is in effect the code book for encoding any non-zero 5-digit information word appearing on a particular channel into a corresponding 31-digit redundant sequence.

Referring now to FIG. 1A, there is shown a transmitting terminal 100 made in accordance with the principles of the present invention. The terminal 100 includes four information sources 102, 104, 106 and 108 each of which is triggered by a signal from a control circuit 110 to supply 5-digit information sequences. Specifically, each source is adapted to supply any non-zero 5-digit word selected from the $2^n-1$ or 31 possible 5-digit binary combinations. It is noted that the output leads emanating from the sources 102, 104, 106 and 108 are designated channels 1, 2, 3 and 4, respectively.

Emphasis hereinafter will be directed to the configuration of the encoding circuitry associated with channel No. 1. The arrangement of the corresponding circuitry of channels 2, 3 and 4 will be apparent from the detailed description of the channel 1 circuitry.

Assume that under the control of a signal from the control circuit 110 the 5-digit word 00001 (wherein the left-most digit is most significant) is supplied by the source 102 of FIG. 1A to a buffer-converter circuit 112 which may, for example, be a shift register. Digit-by-digit shifting of the 5-digit input word 00001 into the circuit 112 is controlled by the circuit 110. Subsequently, in response to a synchronization signal (whose generation will be considered in detail below) the 5-digit word stored in the buffer-converter circuit 112 is gated via five gate units 115 through 119 to a 5-stage feedback shift register 120 in which encoding of the applied word takes place. The encoding operation involves converting the applied 5-digit word into a 31-digit redundant counterpart.

Feedback shift registers of the type shown in FIG. 1A are well known in the encoding art, being described, for example, by W. W. Peterson in "Error Correcting Codes," The M.I.T. Press and John Wiley, 1961. Furthermore, it is known that by establishing a preselected initial signal condition in such a register and by arranging the feedback connections thereof in accordance with a prescribed pattern, it is possible to perform desired encodings therewith in a simple and efficient manner.

The feedback shift register 120 depicted in FIG. 1A includes five EXCLUSIVE-OR circuits and five delay circuits interconnected in the particular manner illustrated. Each EXCLUSIVE-OR circuit of the register 120 functions to provide a "1" output signal if an odd number of "1" signals is applied thereto, and to provide a "0" output signal otherwise. (For this reason EXCLUSIVE-OR circuits are also commonly referred to as modulo 2 adder circuits.) Each delay circuit of the register 120 is arranged to delay a signal applied thereto by exactly one digit period of the encoding cycle of operation.

In accordance with the principles of the present invention, the pattern of interconnections between the five gate units 115 through 119 and the 5-stage shift register 120 shown in FIG. 1A is exactly prescribed. Additionally, the principles of this invention also exactly specify the arrangement of the feedback connections of the register 120.

The interconnections between the gate units 115 through 119 and the feedback shift register 120 are determined by reference to the ideal listed in FIG. 3A. (FIGS. 3B, 3C and 3D are determinative of the corresponding interconnections in the encoding circuitry associated with channels 2, 3 and 4, respectively.) In particular, the connections between the gate unit 119 and the five EXCLUSIVE-OR circuits of the register 120 are specified by the lowest-order five digits represented by polynomial $e_1$ of FIG. 3A. The five right-hand digits represented thereby are 00001 (corresponding to the coefficients of the terms of degree less than 5, with the least significant digit last). From right to left, these five digits correspond respectively to the five EXCLUSIVE-OR circuits included in the shift register 120. Whenever a "1" digit appears in the 5-digit word associated with the gate unit 119 an interconnection is made between the output of the unit 119 and the correspondingly-positioned EXCLUSIVE-OR circuit. Thus, since the right-most digit of the sequence 00001 is a "1," an interconnection is shown in FIG. 1A extending between the unit 119 and the right-most EXCLUSIVE-OR circuit of the register 120.

The interconnections between the gate unit 118 and the EXCLUSIVE-OR circuits of the feedback shift register 120 shown in FIG. 1A are determined by inspection of the coefficients of the 1, X, $X^2$, $X^3$, and $X^4$ terms in the second polynomial ($Xe_1$) listed in FIG. 3A. These coefficients form the 5-digit word 00010 (lowest order to the right). This word specifies that connections be made between the gate unit 118 and the second-from-the-right EXCLUSIVE-OR circuit of the register 120. This connection is shown in FIG. 1A.

In a similar way, the interconnections between the gate unit 117 and the EXCLUSIVE-OR circuits of the shift register 120 are determined by inspection of the coefficients of the 1, X, $X^2$, $X^3$ and $X^4$ terms in the third polynomial ($X^2e_1$) listed in FIG. 3A. These coefficients form the 5-digit word 00100 (lowest order to the right). This word specifies that a connection be made between the unit 117 and the middle one of the five EXCLUSIVE-OR circuits.

The interconnections between the gate unit 116 and the EXCLUSIVE-OR circuits of the register 120 are determined by inspection of the coefficients of the 1, X, $X^2$, $X^3$ and $X^4$ terms in the fourth polynomial ($X^3e_1$) listed in FIG. 3A. These coefficients form the 5-digit word 01001 (lowest order to the right) which specifies that a connection be made between the unit 116 and the second from-the-left EXCLUSIVE-OR circuit and, in addition, that a connection be made between the unit 116 and the right-most EXCLUSIVE-OR circuit.

Finally, the interconnections between the gate unit 115 and the EXCLUSIVE-OR circuits are determined by inspection of the coefficients of the 1, X, $X^2$, $X^3$ and $X^4$ terms in the fifth polynomial ($X^4e_1$) listed in FIG. 3A. These coefficients form the 5-digit word 10010 (lowest order to the right) which specifies that a connection be made from the unit 115 to the second-from-the-right EXCLUSIVE-OR circuit and, in addition, to the left-most EXCLUSIVE-OR circuit.

The feedback connections of the 5-stage shift register 120 shown in FIG. 1A are determined by examination of the irreducible polynomial factor from which the idempotent $e_1$ associated with channel No. 1 is derived. (Similarly, the feedback connections of the encoding shift registers associated with channels 2, 3 and 4 are determined by inspection of the irreducible factors from which the idempotents $e_2$, $e_3$ and $e_4$ are respectively derived.) The irreducible factor from which $e_1$ was derived is $$1 \cdot X^5 + 0 \cdot X^4 + 0 \cdot X^3 + 1 \cdot X^2 + 0 \cdot X^1 + 1 \cdot X^0 \quad (23)$$

The "1" coefficients of the first and last terms of polynomial (23) specify that a main feedback connection be made between the output of the right-most delay unit of the register 120 and an input of the left-most EXCLUSIVE-OR circuit thereof. The "0" coefficient of $X^4$ indicates that no connection be made between this main feedback path and the left-most EXCLUSIVE-OR circuit. On the other hand, the "1" coefficient of $X^2$ specifies that a connection be made between the main feedback path and the second-from-the-right EXCLUSIVE-OR circuit. The "0" coefficient of the $X^3$ and $X^1$ terms indicate that the middle and second-from-the-left EXCLUSIVE-OR circuits are not to be connected to the noted main feedback path.

There has been described above an exact procedure to follow in establishing connections between the gate units 115 through 119 of FIG. 1A and the feedback shift register 120 thereof. In addition, the description above has prescribed the pattern of feedback connections of the register 120. By following the specified procedures, the encoding circuitry associated with channel No. 1 is configured to possess the capability to convert an applied 5-digit input information word into a unique 31-digit version thereof. Specifically, each 5-digit information word is converted into a 31-digit sequence whose lowest-order five digits are identical to the original 5-digit word. For example, application of the information word 10100 to the encoding feedback shift register 120 via the gate units 115 through 119 will result in the appearance on an output lead 125 of the register 120 of a 31-digit word whose lowest-order five digits are 10100 ($X^4 + X^2$ as a polynomial). Inspection of FIG. 3A which, as mentioned earlier, is in effect a code book for all possible channel No. 1 encodings, shows that only the third-from-the-last polynomial of that listing has low order terms which correspond to 10100. Hence, the information word 10100 is converted by the shift register 120 to the 31-digit sequence.

$$0010010110011111000110111010100 \quad (24)$$

which appears on the noted output lead 125.

Thus, it has been shown that a particular 5-digit input word supplied by the information source 102 is converted into a 31-digit redundant word specified by one of the polynomials of the ideal of FIG. 3A. In an exactly similar way it can be shown that the 30 other polynomials listed in FIG. 3A are respectively representative of the 30 other different non-zero 5-digit words capable of being supplied by the source 102. In each case the encoding polynomial definitive of a particular 5-digit word is found by locating the expression in FIG. 3A whose lowest-order 5 terms correspond exactly to the input information word.

As mentioned earlier, the listings of FIGS. 3B, 3C and 3D are respectively associated with channels 2, 3 and 4. By following the same steps detailed above in connection with channel No. 1, it is a straightforward matter to arrange the encoding circuitry 131, 132 and 133 for channels 2, 3 and 4, respectively, to possess the same type of encoding capability as that specified above as being characteristic of channel No. 1. For each channel there are an associated irreducible polynomial factor and a primitive idempotent definitive of the configuration of the encoding circuitry. When so configured, each of channels 2, 3 and 4 converts an applied 5-digit information word into a corresponding 31-digit sequence specified by an associated ideal. For example, application of the 5-digit word 00100 to channel No. 4 results in the encoding circuitry 133 generating and applying to an output lead 130 a 31-digit word specified by the last polynomial ($X^{30}e_4$) of FIG. 3D. If the same 5-digit word were applied to each of channels 2 and 3, the resulting 31-digit sequences that would appear on output leads 127 and 129, respectively, are represented by the 26th ($X^{25}e_2$) and the 11th ($X^{10}e_3$) polynomials of FIGS. 3B and 3C, respectively. It is apparent from the lists of FIGS. 3A through 3D that application of the same 5-digit information word to each of channels 1, 2, 3 and 4 results in the generation of four different 31-digit encoded versions thereof. These four encoded words are applied sequentially, lowest order first, to an output EXCLUSIVE-OR circuit or modulo 2 adder 135 wherein the words are combined in a digit-by-digit manner to form a 31-digit composite sequence which is sent via a transmission link 190 to a receiving terminal 200 which is depicted in detail in FIG. 1B.

Also applied to the output EXCLUSIVE-OR circuit 135 shown in FIG. 1A is a 31-digit synchronization sequence that is generated by a 5-stage feedback shift register 140 of the same general type as that described above in connection with channel No. 1. The feedback connections of the register 140 are specified by the sixth irreducible polynomial factor listed in (21). After establishing these particular feedback connections and introducing a "1" start signal (from the control circuit 110) into the right-most EXCLUSIVE-OR circuit of the register 140, the register 140 proceeds to repeatedly generate (lowest order first) the idempotent $e_5$ which is derived from the sixth irreducible factor of 21. The idempotent $e_5$ has the following form:

$$X^{26} + X^{24} + X^{22} + X^{21} + X^{20} + X^{18} + X^{17} + X^{13}$$
$$+ X^{12} + X^{11} + X^{10} + X^9 + X^6 + X^5 + X^3 + 1 \quad (25)$$

Coupled to the synchronization shift register 140 of FIG. 1A is a comparator and sync generating circuit 142 whose function is to recognize that the register 140 has stored therein a pattern representative of the start of the idempotent $e_5$. In response to this particular pattern, the circuit 142 generates a synchronization signal which is applied to the encoding circuitry of channels 1, 2, 3 and 4 to gate the 5-digit words stored in the respective buffer-converter circuits thereof to the associated encoding shift registers.

The output of the synchronization shift register 140 is applied via a delay unit 144 to appear at an input of the output EXCLUSIVE-OR circuit 135 in digit-by-digit coincidence with the application to the circuit 135 of the 31-digit sequences respectively appearing on the output leads 125, 127, 129 and 130. In this way, a composite word formed from the respective outputs of the encoding circuitry for channels 1, 2, 3 and 4, and of the synchronization register 140, is applied to the transmission link 190.

It is well known (see, for example, the aforecited Peterson text) that one can construct a cyclic error control code by taking as allowable code words all multiples of some polynomial $X^n + 1$. Now, the ideals listed in FIGS. 3A, 3B, 3C and 3D (as well as the ideal that can be generated by the synchronization idempotent $e_5$) are precisely such lists of words. Hence, encoding in accordance with these lists makes the transmitted composite word into an element of a cyclic error detection code if one irreducible factor of degree 5 and its corresponding idempotent are reserved for error control purposes. Illustratively, the last 5-degree polynomial in list (21) is reserved for error control. [In addition, the first irreducible factor of list (21) is reserved for this same purpose.]

Decoding of the composite word described above is carried out in the receiving terminal 200 shown in FIG. 1B. The received word is applied in parallel to each of six channels. The top four are information channels, the fifth is the synchronization channel and the bottom-most one is the error control channel. The decoding circuitry associated with channels 1, 2, 3 and 4 is effective to abstract four 5-digit information words from the composite word and to deliver these words to four utilization circuits 205, 207, 209 and 211 in response to control signals indicative of a proper synchronization condition and a correct error status of the received composite word.

As described in detail above, the feedback connections of the encoding shift register 120 of FIG. 1A are determined from the irreducible polynomial factor $X^5+X^2+1$ associated with channel No. 1. The decoding circuitry (FIG. 1B) for channel No. 1 includes a similar 5-stage shift register 215 whose feedback connections are in effect specified by the reciprocal of the noted irreducible factor. This reciprocal polynomial for channel No. 1 is $X^5+X^3+1$ which specifies that there be a connection between the main feedback path of the register 215 and the middle EXCLUSIVE-OR circuit thereof. By establishing such a configuration we have formed a decoding circuit which is able to divide the polynomial representative of the received composite word by $X^5+X^2+1$. [This stems from the fact that the division circuit given in the aforecited Peterson text (see page 111 thereof) is based upon the highest-order terms being transmitted first, whereas the specification of the feedback connections considers low-order terms from the left rather than the right as in the encoder. For this reason, the connections are reciprocal.] The remainder of this division operation after 31 digit periods will be stored in the register 215 and will be equal (in the absence of errors) to the original 5-digit information word supplied by the source 102 of FIG. 1A.

The decoding circuitry of FIG. 1B for channels 2, 3 and 4 includes three feedback shift registers each of which is configured in accordance with the reciprocal of its associated irreducible polynomial factor. Accordingly, after 31 digit periods this circuitry will have stored therein the original information words supplied by the sources 104, 106 and 108 of FIG. 1A.

The recognition that the end of 31 digit periods has occurred is under the control of the synchronizaion decoding circuitry shown in FIG. 1B. That circuitry comprises a synchronization shift register 220 which is arranged in accordance with the reciprocal of the irreducible polynomial that governed the arrangement of the feedback connections of the synchronization shift register 140 of FIG. 1A. For the particular example considered herein and represented in FIGS. 1A and 1B, the synchronization shift register 220 will have stored therein the word 00001 at the end of each 31-digit block interval. At no other time will such a representation be stored therein.

Associated with the synchronization register 220 is a comparator and trial sync generating circuit 225 which responds to the storage of the unique pattern 00001 to supply a trial synchronization signal to a sync generating circuit 230. If the circuit 230 also receives an activating signal from the error control channel, indicative of a no-error condition in the composite received word, the circuit 230 supplies gating signals to the information decoding circuitry. In response to these gating signal the contents of the four shift registers associated with channels 1, 2, 3 and 4 are delivered to associated buffer-converter circuits. Thereafter the contents of the buffer-converter circuits are shifted, under the control of signals supplied by a control circuit 235, to their respective utilization circuits 205, 207, 209 and 211.

The error control channel shown in FIG. 1B includes a 6-stage feedback shift register 240 whose feedback connections are formed in accordance with the reciprocal of the product of the first and last irreducible polynomial factors listed in (21). Hence, after 31 digit periods, and in the absence of errors, the 6-digit representation stored in the register 240 should be an all-zero word. Thus, if a trial synchronization signal supplied by the comparator and trial sync generating circuit 225 is effective to gate an all-zero word from the register 240 to an associated error-detecting circuit 245, there appears on a lead 247 emanating from the circuit 245 an enabling signal for the sync generating circuit 230. However, if other than an all-zero word is gated to the circuit 245 (indicative of an error occurrence in the received composite word) the sync generating circuit 230 is not enabled and no information words are supplied to the utilization circuits 205, 207, 209 and 211. Of course, other alternative arrangements may be devised to signal the occurrence of errors. For example, the decoded information words may be actually delivered to the noted utilization circuits with suitable tags or associated designations to indicate an error condition thereof.

It is noted that detailed circuit configurations for such units as those designated 110, 112, 142, 225, 230, 235 and 245 have not been given herein because their arrangements are considered in view of the end requirements therefor set forth above to be clearly within the skill of the art.

Thus, there has been described herein in detail a specific illustrative communication system in which four 5-digit information words are encoded and combined with a synchronization sequence to form a composite word. The composite word, which is formed in conformity with the requirements of a cyclic error control code, is then sent to a receiving terminal wherein decoding takes place. Decoding involves abstracting from the received word the information content thereof and, in addition, involves abstracting therefrom information relative to the synchronization condition and error status of the received word.

It is to be understood that the above-described arrangements are only illustrative of the application of the principles of the present invention. In accordance with these principles numerous other arrangements may be devised by those skilled in the art without departing from the spirit and scope of the present invention.

What is claimed is:

1. In combination in a digital information processing system,
    a plurality of input channels,
    means for respectively applying a plurality of $n$-digit input information words to said channels,
    encoding means responsive to said $n$-digit input words for respectively generating a plurality of redundant digital sequences each of digit length $2^n-1$,
    means for generating a unique synchronization sequence of digit length $2^n-1$,
    and means for combining said redundant sequences with said synchronization sequence in a digit-by-digit manner by modulo 2 addition to form a composite sequence of digit length $2^n-1$ which is a member of a cyclic error control code.

2. In combination, means for supplying a plurality of $n$-digit information words,
    means respectively responsive to said information words for generating an equal plurality of encoded versions thereof each $2^n-1$ digits in length,
    and means for combining said encoded versions in a digit-by-digit manner by modulo 2 addition to form a word $2^n-1$ digits in length.

3. A combination as in claim 2 further including means for generating a synchronization sequence $2^n-1$ digits in length and for applying said sequence to said combining means for digit-by-digit modulo 2 addition therein with the encoded versions of said information words to form a composite word which is an element of a cyclic error control code.

4. A combination as in claim 3 still further including a receiving terminal, and means connecting said combining means with said terminal.

5. A combination as in claim 4 wherein said receiving terminal includes,
first means responsive to said composite word for abstracting therefrom a plurality of $n$-digit information words,
second means responsive to said composite word for abstracting therefrom an $n$-digit sequence indicative of the synchronization condition of said composite word,
and third means responsive to said composite word for abstracting therefrom an $(n+1)$-digit sequence indicative of the error status of said composite word.

6. A combination as in claim 5 further including a plurality of utilization circuits, and means responsive to said second means indicating a proper synchronization condition and to said third means indicating a correct error status for respectively gating said plurality of abstracted $n$-digit information words to said utilization circuits.

7. In combination,
a source of $n$-digit information words,
means for encoding each of said words into a redundant sequence $2^n-1$ digits in length, said encoding means including gate means and an $n$-state encoding shift register, a buffer-converter circuit responsive to words supplied by said source for applying said words to said gate means,
first means interconnecting said gate means to the stages of said shift register,
and second means forming feedback connections for the stages of said shift register, said feedback connections being arranged to conform with an irreducible factor of degree $n$ of the polynomial $X^{2^n-1}+1$, said factor being generative of a corresponding primitive idempotent which in turn is generative of an ideal,
said first means being connected to the $n$ stages of said shift register to conform with the first $n$ polynomial elements of said ideal.

8. A combination as in claim 7 further including a plurality of said sources and a corresponding plurality of said encoding means, each of said plurality of encoding means having associated therewith a different set including an irreducible factor of degree $n$, a primitive idempotent, and an ideal, and means for combining the redundant $(2^n-1)$-digit sequences respectively supplied by said encoding means for forming a first composite word embodying therein said information words and error control capabilities.

9. A combination as in claim 8 further including a receiving terminal, and a transmission link connecting said combining means to said terminal.

10. A combination as in claim 9 wherein said receiving terminal comprises a plurality of decoding circuits each including an $n$-stage shift register responsive to said composite word, each of said shift registers including feedback connections arranged to conform with a different one of the reciprocals of the irreducible polynomial factors in accordance with which the feedback connections of said encoding shift registers are formed.

11. A combination as in claim 10 further including means for generating a synchronization sequence $2^n-1$ digits in length which corresponds to the primitive idempotent derived from still another one of the irreducible factors of degree $n$ of the polynomial $X^{2^n-1}+1$, and means for applying said synchronization sequence to said combining means to form a second composite word embodying therein said information words, error control capabilities and said synchronization sequence.

12. A combination as in claim 11 further including means in said receiving terminal responsive to said second composite word for abstracting therefrom signals indicative of the synchronization condition of said second word.

13. A combination as in claim 12 still further including means in said receiving terminal responsive to said second composite word for abstracting therefrom signals indicative of the error status of said second word.

14. Apparatus for encoding an $n$-digit information word into a $(2^n-1)$-digit sequence corresponding to an element of the ideal generated by the primitive idempotent of an irreducible $n$-degree polynomial factor of the polynomial $X^{2^n-1}+1$, said factor having $n$ terms each of whose coefficients is either a "1" or a "0," said apparatus comprising an $n$-stage encoding shift register including input, output and intermediate stages, said $n$ stages corresponding respectively to the $n$ terms of said irreducible polynomial factor, and means for respectively applying the digits of said word to the stages of said register, said register including a main feedback path connected between said input and output stages and further including a connection between said main feedback path and the ones of said intermediate stages whose corresponding terms in said irreducible factor are characterized by "1" coefficients.

15. Apparatus as in claim 14 further including decoding means connected to the output stage of said encoding shift register, said decoding means including an $n$-stage decoding shift register including input, output, and intermediate stages, and means for applying said $(2^n-1)$-digit sequence to the input stage of said decoding shift register, said $n$ stages of said decoding shift register corresponding respectively to the $n$ terms of the reciprocal of said irreducible polynomial factor, said decoding shift register including a main feedback path connected between said input and output stages, said decoding register further including a connection between said main feedback path and the ones of said intermediate stages whose corresponding terms in said reciprocal polynomial factor are characterized by "1" coefficients.

References Cited
UNITED STATES PATENTS 3,358,082  12/1967  Helm _____ 178—50
3,358,083  12/1967  Helm _____ 178—50

ROBERT L. GRIFFIN, *Primary Examiner.*

J. T. STRATMAN, *Assistant Examiner.*